July 28, 1964     K. HERTEL     3,142,110
CUTTING TOOL FOR LATHES AND SIMILAR MACHINES
Filed Dec. 10, 1959     3 Sheets-Sheet 1

Inventor:
KARL HERTEL

By: *[signature]*

ATTORNEYS

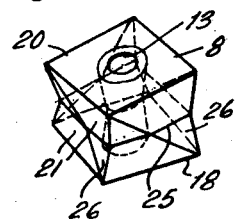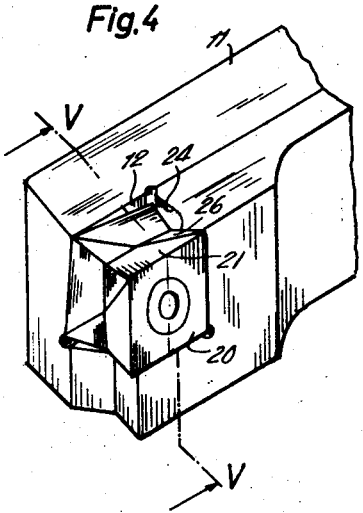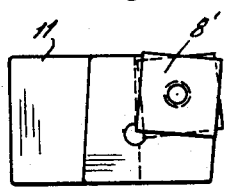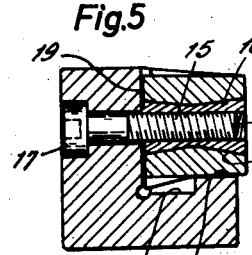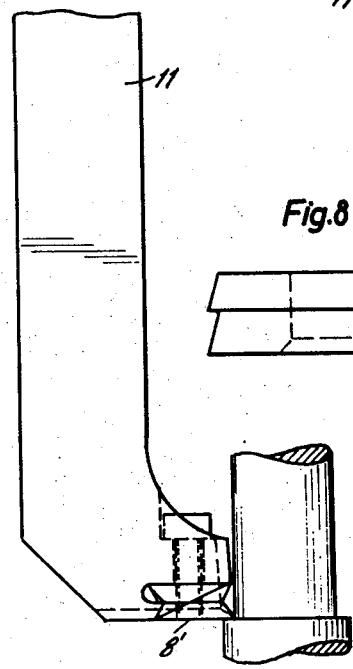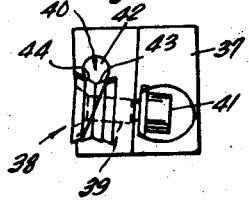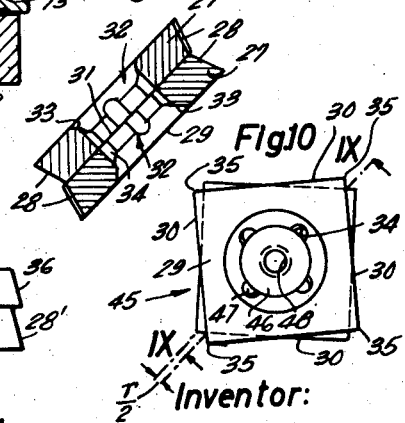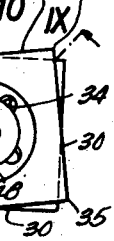

July 28, 1964  K. HERTEL  3,142,110
CUTTING TOOL FOR LATHES AND SIMILAR MACHINES
Filed Dec. 10, 1959  3 Sheets-Sheet 3
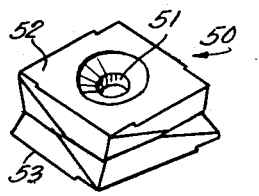
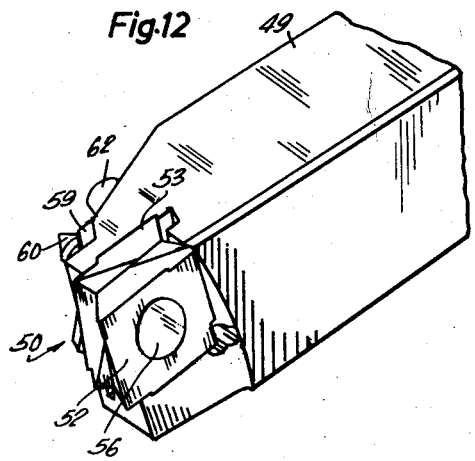
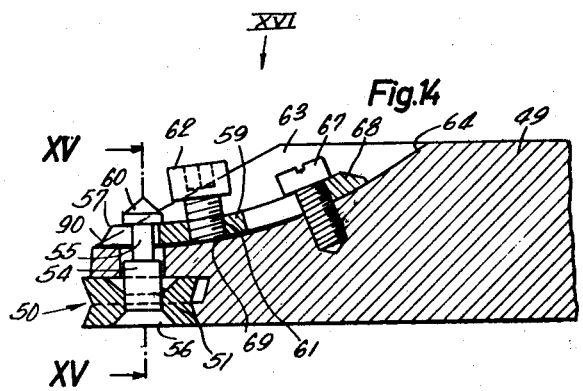
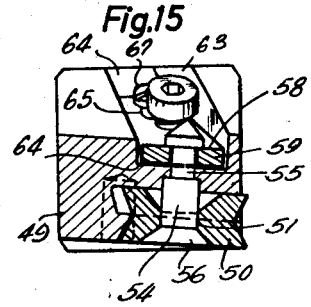
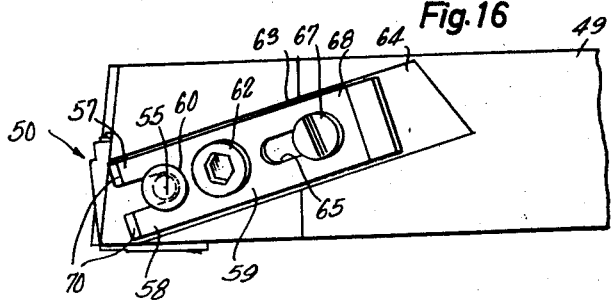
Inventor:
KARL HERTEL
ATTORNEYS United States Patent Office 3,142,110
Patented July 28, 1964

3,142,110
CUTTING TOOL FOR LATHES AND SIMILAR
MACHINES
Karl Hertel, Oedenbergerstrasse 29, Nurnberg, Germany
Filed Dec. 10, 1959, Ser. No. 858,795
Claims priority, application Germany Apr. 30, 1959
15 Claims. (Cl. 29—96)

This invention relates to a tool or cutter including a cutter element, cutting insert, or cutting bit of hard cutting material, such as hard metal or cutting ceramic, arranged in a recess of a tool holder, and formed with several cutting edges which can be brought successively into cutting position by adjustment of the cutter element relative to the recess of the tool holder.

Cutters or tools of this type are used in metal working, primarily in turning lathes, planing machines, turret lathes and similar machine tools. The known tools of this type have the disadvantage that, when the cutting edge of the tool has become dull, it is necessary either to replace the cutting element entirely by a new sharp one or at least to regrind the cutting edge before the tool can again be used. Obviously, such replacement or re-grinding of the cutting element involves a considerable interruption in the operation of the machine tool and in the course of production of any articles thereon.

An object of the present invention is to provide a cutter element having eight cutting edges whose cutting angle is positive in order to reduce the cutting forces and to improve the form of the cut.

A further object of the invention is to provide such a cutter which is easy to manufacture.

Another object of the invention is to provide such a cutter which can be secured in position in a recess of a tool holder without the use of any special complicated clamping or pressure exerting means.

These and other objects, features, and advantages of the present invention will also appear from the following detailed description thereof, particularly when the same is read with reference to the accompanying drawings, in which—

FIG. 3 is a perspective view of a modified form of cutter element;

FIG. 4 is a partial perspective view of a cutter or tool illustrating a tool holder having the cutter of FIG. 3 mounted in a recess therein;

FIG. 5 is a sectional view taken on the line V—V of FIG. 4;

FIGS. 6 and 7 are, respectively, an end elevation view and a plan view of a facing tool having mounted, in the tool holder thereof, a modified form of the embodiment of the cutter element shown in FIG. 3;

FIG. 8 is a side elevation view of one half of another modified form of cutter element embodying two detachably interconnected halves;

FIG. 9 is a sectional view, taken on the line IX—IX of FIG. 10 illustrating another form of cutter embodying the invention;

FIG. 10 is a plan view of the cutter shown in FIG. 9;

FIG. 11 is a plan view of a cutter embodying two halves of a cutter element, such as shown in FIG. 8, as mounted in a recess in a tool holder;

FIG. 12 is a partial perspective view of a tool illustrating another form of cutter, embodying the invention, mounted in a recess in the tool holder thereof;

FIG. 13 is a perspective view of the cutter element shown in FIG. 12;

FIG. 14 is a partial longitudinal sectional view of the cutter or tool shown in FIG. 12;

FIG. 15 is a transverse sectional view taken on the line XV—XV of FIG. 14; and

FIG. 16 is a partial plan view of the cutter shown in FIG. 14 looking in the direction of the arrow XVI.

Figure 1:
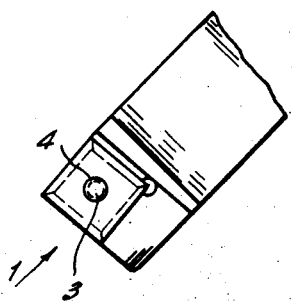
FIGS. 1 and 2 are, respectively, a partial side elevation view and a top plan view of a bent roughing tool having a cutter element embodying the invention positioned in a recess in the tool holder.
Figure 2:
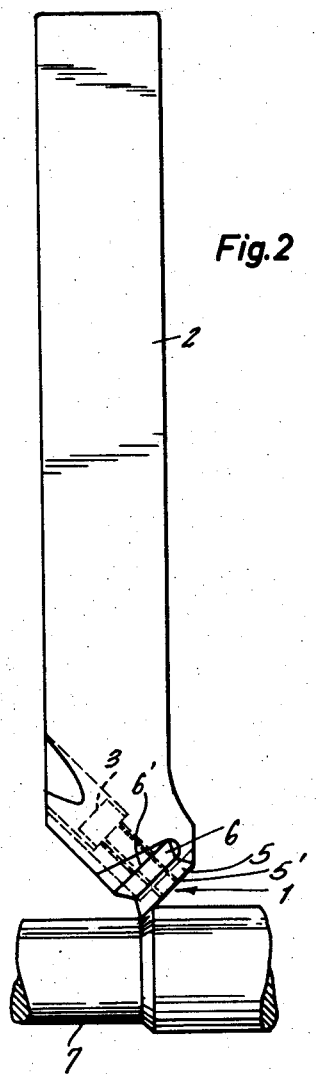

Referring to FIGS. 1 and 2, a cutter element 1 embodying the invention is illustrated as mounted in a recess in a tool holder 2 to form a tool or cutter for machining a workpiece 7. Cutter element 1 is retained in the recess by a stud or screw 3 whose head engages the bottom of a lateral recess in the tool holder 2 and which is threaded into a threaded bore 4 in the cutter element 1. One plane surface of cutter element 1 engages a plane seating surface of the recess, and it will be noted that at least one side edge of cutter element 1 is engaged with the side wall of the recess to retain cutter element 1 against relative rotation.

In FIGS. 1 and 2, tool cutter 1 has the form of a pair of opposed truncated pyramids having quadrilateral bases, with the smaller bases or heads being in abutment and with the larger bases 5' and 6' of the respective truncated pyramids 5 and 6 being parallel to each other. During the machining of workpiece 7, the sloping side surfaces of the truncated pyramids 5 and 6, in accordance with the respective cutting edge engaged with the workpiece 7, form the chip deflecting surfaces. It will be noted that the cutting edges have an angle of less than 90° so as to provide a positive cutting angle. Furthermore, in the cutter element 1 illustrated in FIGS. 1 and 2, the opposed edges of the truncated pyramids are parallel to each other, and preferably the bases are rectangular, and furthermore, preferable square in plan.

The tool according to the modification as illustrated in FIGURES 3 to 5 is designed to be used as a side tool. The tool holder 11 has in its front edge a recess 12 in which a cutting element 8 is mounted. This cutting element has a transverse aperture 13 which is filled out with an easily meltable copper alloy into which a threaded bore 14 is cut for receiving a drawscrew 15. As illustrated in FIGURE 5, recess 13 is formed by two oppositely directed frusto-conical apertures which prevent the soft metal insert from being pulled out of this aperture 13. It thus forms a threaded bushing 16 which cannot become disengaged and into which screw 15 is inserted, the head of which 17 is sunk into tool holder 11.

Cutting element 8 engages with one flat surface 18 with the lateral surface 19 of recess 12 in tool holder 11 and has a square surface 20 which extends parallel to surface 18. The surface 21 which extends at right angles to surfaces 19 and 20 then rests on the bottom surface 22 of recess 12. This is illustrated particularly in FIGURE 5 which also shows that the surface 22 is undercut to form a recess 23 into which the lower projecting edge of cutting element 8 extends. A similar recess 24, as shown in FIGURE 4, is also provided in one side wall of the main recess 12. These recesses 23 and 24 are required since the pyramidal-like portions of the cutting element 8 are twisted or angularly offset relative to each other about the axis of the threaded bore 14 along the line 25 to the extent of the clearance angle. This is shown in FIGURE 3. Directly adjacent to the edges, triangular surfaces 26 are ground which extend at an obtuse angle to surface 27 to define deflecting surfaces for the chips. The outer surfaces of cutting element 8 and the cutting edges thereof as just described are identical on all four sides thereof. By being ground in this manner, the side tool will have a clearance angle in every mounting position in tool holder 11.

The particular advantage of the tool according to FIGURES 3 to 5 is that the cutting element 8 has eight cutting edges which may be used alternately or successively. Only after all eight cutting edges are dull will it be necessary that the cutting element be reground which only has to be done on the flat end surfaces 18 and 20. If a positive side rake is desired, the lateral surfaces may also be undercut. The height of the truncated pyramids 5 and 6 is essentially arbitary and is selected in accordance with the respective use to be made of the cutting element. Thus, FIGS. 6 and 7 illustrate a cutter 8' in which the height of the truncated pyramids arranged in end to end relation is less than the height of the truncated pyramids of the cutter element shown in FIGS. 3, 4 and 5.

FIGURE 8 and all the remaining figures in the drawings illustrate the cutting element which is composed of two separate half-sections, each of which is a truncated pyramid and consists of a hard metal or ceramic material. The half-section 27 has four lateral surfaces 28, each of which is associated with the square surface 29 to form one of the cutting edges 30 which may be used alternatively. Surface 29 may also serve as the supporting surface of the cutting element. The lateral surfaces 28 are inclined relative to the square surface 29 at an angle of, for example, 18°, in accordance with the side rake γ of the cutting element. Consequently, any one of the lateral surfaces 28 of one or the other half-section may form the rake surface of the cutting element in the particular mounting position thereof. The flat surface 31 is used for connecting one half-section of the cutting element to the other half-section of the same shape. Each half-section has a central bore 32 extending vertically to the supporting surface 29, and this bore has a conical enlargement 33 at the side facing toward the supporting surface 29. The wall of bore 32 is further provided with two pairs of grooves 34 which are located within the two radial planes which intersect with the diagonally opposite corners 35 of cutting edges 30. Preferably, each half-section of the cutting element has a height of less than one-quarter of the length of each cutting edge.

In the modification according to FIGURE 8, each of the four lateral surfaces 28' of the half-section 27' is provided with a step-shaped portion 36.

FIGURE 10 shows a cutting element 45 which may, for example, likewise be used in the tool holder 11 and which is provided with grooves 34 which are ground into the wall of the bore in each half-section. These grooves 34 of each of the two equal half-sections are disposed within two radial planes which cross each other at right angles and deviate relative to the diagonal places which intersect with the corners 35 of the cutting edges by an amount which is equal to one-half of the clearance angle, that is, for example, by being turned 3° toward the right. Therefore, after the two half-sections of cutting element 45 are combined, and are then turned relative to each other toward the left by an angle of 6°, the two pairs of grooves in each half-section will be in alignment with each other.

After the insertion of bushing 46, which is provided with outwardly projecting longitudinal ribs 47 extending within rectangularly intersecting radial planes, the half-sections of this cutting element 45 will therefore be locked against any turning even though no other means might be provided for this purpose. For receiving the inner hexagonal screw, the bushing is provided with a threaded socket bore 48. FIGURE 11 illustrates a right-side tool 37 with a cutting element 38 in which the half-sections 27' are turned toward the left relative to each other, and also the manner in which the cutting element is clamped to the tool holder 37 by means of a smooth bushing 39 which is made of steel. Cutting element 27' is thus firmly secured at its supporting surface 29 and within the prismatic recess 40 of the tool holder 37 which is open toward three sides by means of bushing 39 which is inserted into the continuous bore of both half-sections and by the inner hexagonal drawscrew 41. After this drawscrew 41 has been removed, bushing 39 can be easily taken out of the cutting element. Recess 40 in tool holder 37 has corner clearances so that one of the lateral surfaces of the non-cutting half-section will rest in the latter without engaging with the tool holder. Cutting element 38 is further associated with a bolt 42 which supports the cutting element to take up the main cutting force to which it is subjected. This bolt 42 is secured with a force fit in the tool holder and in the recess. It has contact surfaces 43 and 44 which engage with a pair of stepped surfaces 36 of the cutting element, as shown in FIGURE 8.

Extensive tests have shown that a turning tool with a square cross section of 25 x 25 mm. which is equipped with a cutting element according to the invention which is composed of two half-sections consisting of hard metal plates placed on edge may be subjected to stresses which a normal turning tool of alloyed high-speed steel can sustain only if it has a cross section of 40 x 40 mm.

It has further been found that if one half-section should become unserviceable by breakage, fissures, or the like, the other half-section will not be affected but remain fully serviceable.

FIGURES 12 to 16 finally illustrate a tool holder 49 which contains a cutting element 50 being provided with a bore 51 and consists of two half-sections 52 and 53 which are turned relative to each other in a manner as previously described.

Into this bore 51, a member 54 is inserted which has a recessed portion 55 and a conical portion 56. This member 54 may also be rigidly secured to cutting element 50. By means of the two bifurcated ends 57 and 58, a slide member 59 may be inserted into the recessed portion 55 and engage with the shoulder formed by the end portion 60 of member 54. In order to facilitate the insertion of slide member 59 into the recessed portion 55 of member 54, the ends 57 and 58 are provided with a beveled end surface 70. Slide member 59 has a threaded bore 61 into which a screw 60 is inserted.

In the particular embodiment as illustrated, slide member 59 is arcuately bent and guided within a groove 63, the bottom 64 of which is also arcuately curved similar to slide member 59. Slide member 59 is further provided with a longitudinal aperture 65 through which a screw 66 is inserted so that the head 67 thereof engages with the upper surface 68 of slide member 59.

If screw 62 is tightened, its end 69 is pressed against the curved bottom 64 of groove 63, whereby slide member 59, pivoting about screw head 67, will be clamped securely to member 54 so that cutting element 50 will also be rigidly secured to tool holder 49.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A cutting element formed of a hard cutting material and constructed and arranged to be secured in a cutting position, said cutting element having a plurality of positive cutting edges which can be brought successively into cutting position by turning said cutting element step by step about an axis thereof; said cutting element being formed of a pair of generally frusto-pyramidal-like symmetrical and substantially identical portions arranged in opposition with their heads in abutment; the bases of said two portions being planar and square and extending parallel to each other; all lateral edges of both bases of the cutting element constituting said cutting edges, and the lateral surfaces of said two portions constituting chip guiding surfaces.

2. A cutting element, as claimed in claim 1, in which each cutting edge of the base of one portion extends parallel to the corresponding cutting edge of the base of the other portion.

3. A cutting element as claimed in claim 1, in which the bases of the two frusto-pyramidal-like portions, including cutting edges, are twisted relative to each other about said axis.

4. A cutting element as claimed in claim 1, in which additional chip-guiding surfaces of triangular form are formed on the lateral surfaces of the frusto-pyramidal-like portions.

5. A cutting element as claimed in claim 1, in which said frusto-pyramidal-like portions are separate elements, and each includes a head surface parallel with the base surface thereof.

6. A cutting element as claimed in claim 1, in which said frusto-pyramidal-like portions are formed with chip breaking steps.

7. A cutting element, as claimed in claim 1, said cutting element being formed with a bore extending therethrough perpendicular to the bases of said portions, for receiving clamping means.

8. A cutting element as claimed in claim 7, including a bushing in said bore, said bushing being formed to receive a clamping means.

9. A cutting element, as claimed in claim 7, in which said bore has conical countersunk end portion to seat a conical head on a clamping means.

10. In a tool, in combination, a tool holder formed with a recess including a substantially flat seating surface and a rectilinear edge surface substantially normal to said substantially flat surface; a cutting element of a hard cutting material, having a plurality of positive cutting edges which can be brought succesively into cutting position by turning said cutting element step by step about an axis thereof; said cutting element being in the form of a pair of generally frusto-pyramidal-like symmetrical and identical portions arranged in opposition with their heads in abutment, the bases of said two portions being plane and square and extending parallel to each other; all lateral edges of both bases of the cutting element constituting said cutting edges, and the lateral surfaces of said two portions constituting chip-guiding surfaces; said element being formed with a bore extending along its axis and perpendicular to its bases, said recess having a bore substantially coaxial with the bore in said element when a base of said element is in engagement with the flat surface of said recess and an edge of said element is in engagement with said rectilinear edge surface of said recess; and clamping means extending through both bores and effective to draw said cutting element against said holder.

11. In a tool, as claimed in claim 10, said clamping element being a clamping bolt threaded to receive a clamping nut.

12. In a tool as claimed in claim 10, said clamping element being in the form of a bolt having a first head on one end thereof engageable by wedging means for drawing a second head on the opposite end of said bolt into tight engagement with said cutting element, to clamp said cutting element in position.

13. In a tool, as claimed in claim 12, said wedging means comprising a resilient slide mounted for sliding movement in a recess of the tool holder; said slide having a longitudinally arcuate form and having a notch at one end arranged to engage under said first head of said bolt to draw said second head of said bolt into tight clamping engagement with the cutting element.

14. In a tool as claimed in claim 13, said resilient slide being formed with a longitudinally extending slot, and a stud engaged through said slot and secured to said tool holder for maintaining said slide in engagement with said tool holder.

15. In a tool as claimed in claim 14, a set screw threaded through said slide and engageable in abutment with said tool holder to force said slide outwardly to augment the clamping action thereof.

References Cited in the file of this patent

UNITED STATES PATENTS

| | | |
|---|---|---|
| 994,668 | Childs | June 6, 1911 |
| 2,448,385 | Michela | Aug. 31, 1948 |
| 2,581,609 | Small | Jan. 8, 1952 |
| 2,664,617 | Kralowetz | Jan. 5, 1954 |
| 2,899,738 | Almen | Aug. 18, 1959 |
| 3,040,632 | Walter | June 26, 1962 |
| 3,045,322 | Hertel | July 24, 1962 |
| 3,060,554 | Kirchner | Oct. 30, 1962 |

FOREIGN PATENTS

| | | |
|---|---|---|
| 449,557 | Germany | Sept. 24, 1927 |
| 887,592 | Germany | Aug. 24, 1953 |
| 350,706 | Great Britain | June 18, 1931 |
| 552,382 | Great Britain | Apr. 5, 1943 |